US012553361B2

(12) United States Patent
Messier et al.

(10) Patent No.: US 12,553,361 B2
(45) Date of Patent: Feb. 17, 2026

(54) WIRELESS TELEMETRY MODULE SYSTEM FOR AN AIRCRAFT ENGINE

(71) Applicant: Pratt & Whitney Canada Corp., Longueuil (CA)

(72) Inventors: Francois Messier, Varennes (CA); Alexandre Bosse, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 101 days.

(21) Appl. No.: 18/620,392

(22) Filed: Mar. 28, 2024

(65) Prior Publication Data

US 2025/0305422 A1 Oct. 2, 2025

(51) Int. Cl.
| | |
|---|---|
| G01M 15/14 | (2006.01) |
| F01D 17/02 | (2006.01) |
| F01D 21/00 | (2006.01) |
| F02C 7/00 | (2006.01) |
| H04Q 9/00 | (2006.01) |

(52) U.S. Cl.
CPC .............. *F01D 21/003* (2013.01); *F02C 7/00* (2013.01); *G01M 15/14* (2013.01); *H04Q 9/00* (2013.01); *F05D 2260/83* (2013.01)

(58) Field of Classification Search
None
See application file for complete search history.

(56) References Cited

U.S. PATENT DOCUMENTS

| | | | |
|---|---|---|---|
| 8,220,319 B2 | 7/2012 | Schleif | |
| 9,071,888 B2 | 6/2015 | Subramanian | |
| 9,334,067 B2 | 5/2016 | Macchia | |
| 9,523,351 B2 | 12/2016 | Shaw | |
| 9,698,579 B2 | 7/2017 | Schleif | |
| 9,777,589 B2 | 10/2017 | Schleif | |
| 9,863,269 B2 | 1/2018 | Shaw | |

(Continued)

FOREIGN PATENT DOCUMENTS

| | | |
|---|---|---|
| WO | 2011110170 B1 | 3/2011 |
| WO | 2011110170 A1 | 9/2011 |

OTHER PUBLICATIONS

EP Search Report for EP Patent Application No. 25167199.6 dated Jun. 30, 2025.

*Primary Examiner* — Curtis A Kuntz
*Assistant Examiner* — Jerold B Murphy
(74) *Attorney, Agent, or Firm* — Getz Balich LLC

(57) ABSTRACT

A telemetry module system for mounting on a rotatable shaft is provided that includes a telemetry module and a connector ring. The telemetry module includes an annular TM housing, a plurality of transmitters, and a first connectivity board. The TM housing extends axially between first and second TM axial ends. Each transmitter is configured to produce RF signals based on sensor input signals. The first connectivity board has a ring configuration and is in signal communication with the transmitters. The connector ring (CR) has an annular CR housing and a second connectivity board. The CR housing extends axially between first and second CR axial ends. The second connectivity board has a ring configuration and is attached to the CR housing. The second connectivity board is configured to receive sensor input signals. The telemetry module and the connector ring are configured to be disposed in a coupled configuration.

20 Claims, 8 Drawing Sheets

(56) References Cited

U.S. PATENT DOCUMENTS

| | | |
|---|---|---|
| 10,198,391 B2 | 2/2019 | Duffy |
| 10,661,914 B2 | 5/2020 | Ziarno |
| 11,927,104 B2 | 3/2024 | Stolfus |
| 2011/0133949 A1 | 6/2011 | Subramanian |
| 2013/0192259 A1* | 8/2013 | Borja ............... F01D 5/027 60/803 |
| 2015/0061893 A1 | 3/2015 | Bevly, III |
| 2016/0118777 A1* | 4/2016 | Schleif ............. F01D 17/06 29/857 |
| 2017/0058694 A1* | 3/2017 | Shaw ............... F03D 80/82 |
| 2017/0145853 A1 | 5/2017 | Hesler |
| 2024/0218806 A1 | 7/2024 | Stolfus |
| 2024/0410787 A1 | 12/2024 | Overend |

* cited by examiner

WIRELESS TELEMETRY MODULE SYSTEM FOR AN AIRCRAFT ENGINE

BACKGROUND OF THE INVENTION

1. Technical Field

The present invention relates to systems for collecting data within a gas turbine engine that may be used, for example, during testing and/or certification of the engine.

2. Background Information

A thermal engine used for aircraft propulsion (e.g., a gas turbine engine) may be instrumented with various sensors to measure parameters relating to engine performance, strength and durability of engine parts and modules, and the like. In some instances, the instrumentation may be utilized on an engine utilized for testing and/or certification. In other instances, the instrumentation may be utilized on an engine that is used for commercial purposes; e.g., to collect data that may be used for performance evaluation, for maintenance purposes, or the like. The instrumentation may include sensors that are disposed with static engine structure and other sensors that are disposed on components that rotate during engine operation. In the latter case, a wireless telemetry device (sometimes referred to as a "wireless telemetry tub") may be used to transmit sensor data produced by sensors disposed on rotating components to a data system for collection, storage, processing, and the like.

SUMMARY

According to an aspect of the present disclosure, a telemetry module system for mounting on a rotatable shaft having a central axis is provided. The system includes a telemetry module and a connector ring. The telemetry module (TM) includes an annular TM housing, a plurality of transmitters, and a first connectivity board. The TM housing extends axially between a TM first axial end and a TM second axial end and includes a TM central bore configured to receive the shaft for mounting of the telemetry module on the shaft. Each transmitter of the plurality of transmitters is configured to produce radio-frequency signals based on a sensor input signal. The first connectivity board has a ring configuration and is attached to the TM housing at the TM second axial end. The first connectivity board is in signal communication with the plurality of transmitters. The connector ring (CR) has an annular CR housing and a second connectivity board. The CR housing extends axially between a CR first axial end and a CR second axial end and includes a CR central bore configured to receive the shaft for mounting of the connector ring on the shaft. The second connectivity board has a ring configuration and is attached to the CR housing at the CR first axial end. The second connectivity board is configured to receive sensor input signals. The telemetry module and the connector ring are configured to be disposed in a coupled configuration and in the coupled configuration the first connectivity board is in signal communication with the second connectivity board.

In any of the aspects or embodiments described above and herein, the first connectivity board may include a plurality of first pin receivers distributed around a circumference of the first connectivity board, and the plurality of first pin receivers may be in signal communication with the plurality of transmitters. The second connectivity board may include a plurality of second pin receivers distributed around a circumference of the second connectivity board, and the plurality of second pin receivers may be configured to receive the sensor input signals.

In any of the aspects or embodiments described above and herein, the plurality of first pin receivers may be aligned with the plurality of second pin receivers in the coupled configuration.

In any of the aspects or embodiments described above and herein, the system may include a plurality of connector pins, wherein each connector pin is configured for engagement with a respective first pin receiver and a respective second pin receiver, and each connector pin is configured to provide signal communication between the respective first pin receiver and the respective second pin receiver.

In any of the aspects or embodiments described above and herein, each connector pin may include first and second pin segments, and the first pin segment may be configured to be received within the respective first pin receiver, and the second pin segment may be configured to be received within the respective second pin receiver.

In any of the aspects or embodiments described above and herein, each connector pin may include a central collar disposed between the first and second pin segments.

In any of the aspects or embodiments described above and herein, the TM housing may include a board channel that is open to the TM second axial end and the first connectivity board may be disposed within the board channel.

In any of the aspects or embodiments described above and herein, the TM housing may include a transmitter channel that is open to the TM first axial end and the plurality of transmitters may be disposed within the transmitter channel.

In any of the aspects or embodiments described above and herein, the TM housing may be a unitary structure.

In any of the aspects or embodiments described above and herein, the connector ring may be a unitary structure.

According to an aspect of the present disclosure, a gas turbine engine is provided that includes a compressor section, a combustor section, a turbine section, a rotatable engine shaft having a central axis, a plurality of sensors configured to produce sensor signals, and a telemetry module system for mounting on the rotatable shaft having a central axis. The telemetry module system includes a telemetry module and a connector ring. The telemetry module (TM) has an annular TM housing, a plurality of transmitters, and a first connectivity board. The TM housing extends axially between first and second TM axial ends and includes a TM central bore. The shaft is received within the TM central bore. Each transmitter is configured to produce RF signals based on a sensor input signal. The first connectivity board has a ring configuration and is attached to the TM housing at the TM second axial end. The first connectivity board is in signal communication with the plurality of transmitters. The connector ring (CR) has an annular CR housing and a second connectivity board. The CR housing extends axially between first and second CR axial ends and includes a CR central bore. The shaft is received within the CM central bore. The second connectivity board has a ring configuration and is attached to the CR housing at the CR first axial end. The second connectivity board is configured to receive the sensor signals. The telemetry module and the connector ring are configured to be disposed in a coupled configuration and in the coupled configuration the first connectivity board is in signal communication with the second connectivity board.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
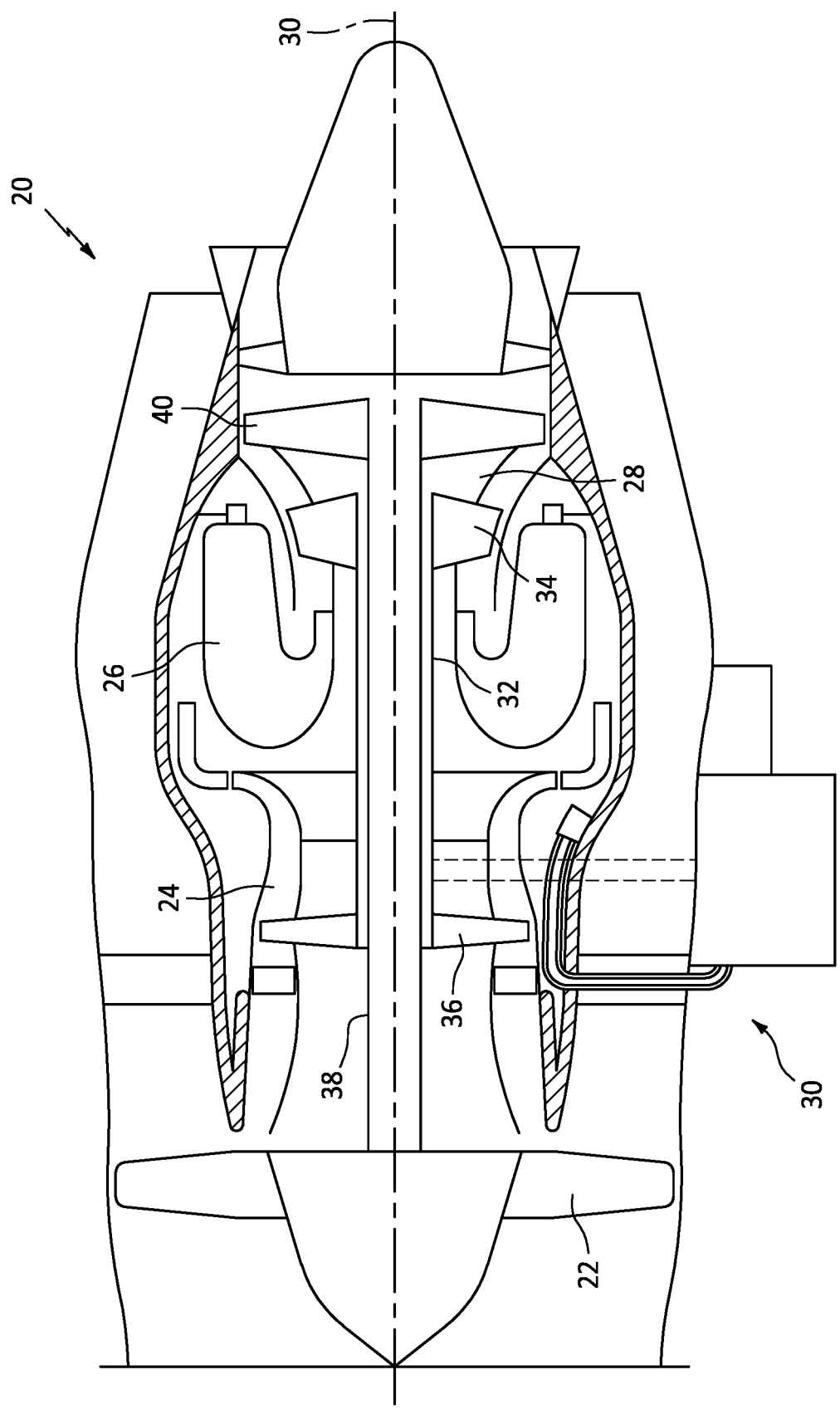
FIG. 1 is a diagrammatic sectional view of a gas turbine engine embodiment.

The present disclosure telemetry module system may be used with a gas turbine engine. FIG. 1 diagrammatically illustrates an example of a gas turbine engine 20 with which the present disclosure may be used. The gas turbine engine 20 includes a fan section 22, a compressor section 24, a combustion section 26, a turbine section 28, and an axial centerline 30. In this gas turbine engine 20 example, a high speed shaft 32 connects a turbine stage 34 to a compressor stage 36 and a low speed shaft 38 connects a turbine stage 40 to the fan section 22. The present disclosure may be utilized with a variety of different gas turbine engine types, including turboprop engines, turboshaft engines, turbojet engines, a propfan engines, open rotor engines, auxiliary power units (APU), or the like. The present disclosure is not therefore limited to use with the example gas turbine engine 20 type shown in FIG. 1. In addition, the present disclosure telemetry module system may in some embodiments be utilized with other thermal engines used for propulsion purposes in an aircraft, such as a piston engine or a rotary engine.

Figure 2:
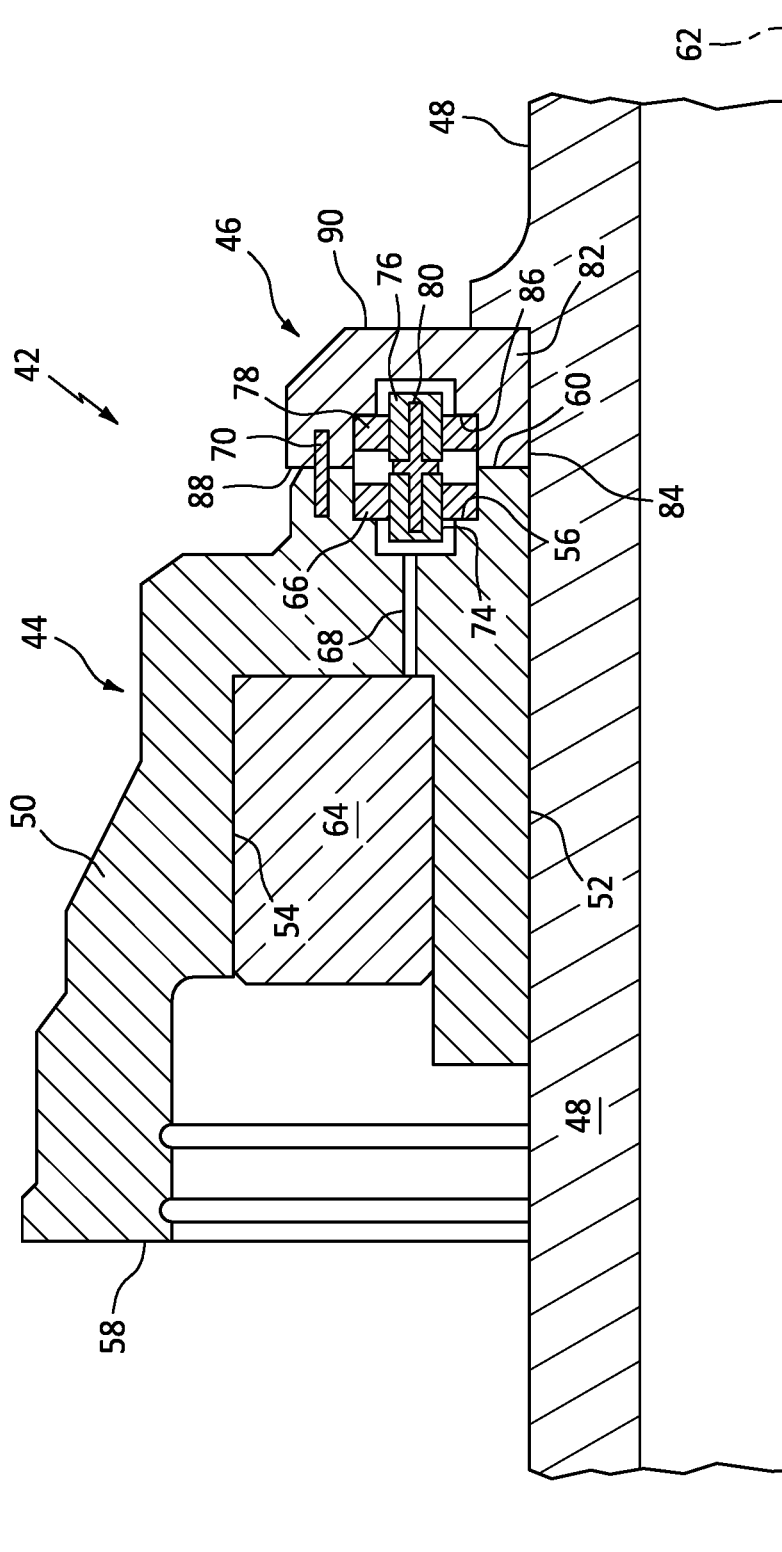
FIG. 2 is a diagrammatic sectional view of a telemetry module system embodiment mounted on a shaft.
Figure 3:
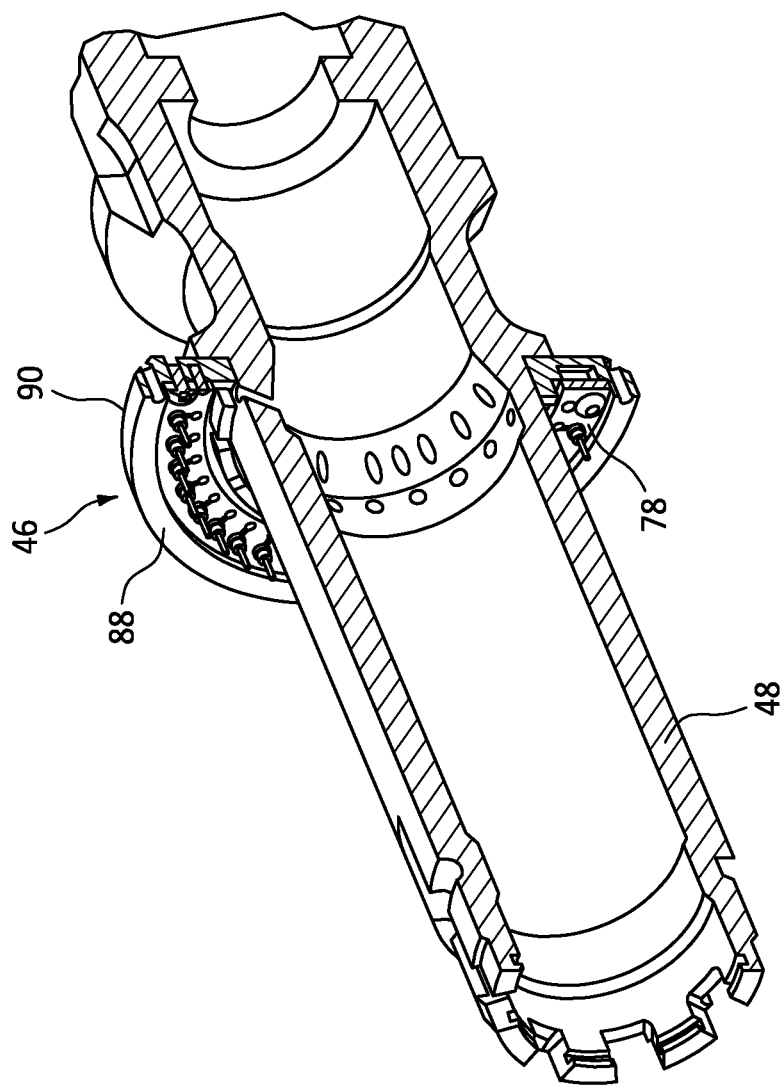
FIG. 3 is a diagrammatic perspective exploded view of a telemetry module system embodiment.
Figure 3:
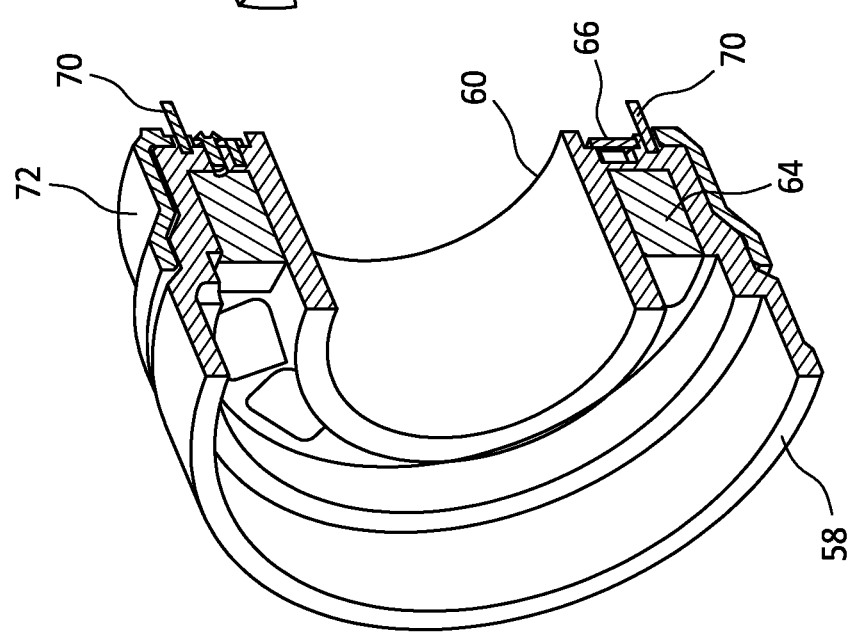

FIG. 2 is a diagrammatic view of an embodiment of a present disclosure telemetry module system 42 that includes a telemetry module (TM) 44 and a connector ring 46. In FIG. 2, the telemetry module 44 and the connector ring 46 are shown in a coupled configuration, mounted on an engine shaft 48 (e.g., a low speed shaft) for rotation with the shaft 48. FIG. 3 is a diagrammatic exploded view of the telemetry module 44 and connector ring 46 shown in FIG. 2. In FIG. 3, the connector ring 46 is mounted on the shaft 48 and the telemetry module 44 is separated from the shaft 48. As will be detailed herein, the telemetry module 44 and the connector ring 46 are configured to couple with one another to create electrical and physical connections therebetween.

The telemetry module 44 includes an annular housing 50 with a central bore 52, a transmitter channel 54, a board channel 56, a first axial end 58, a second axial end 60, and a central axis 62. The central bore 52 is centered on the central axis 62 and is configured to receive a portion of the shaft 48 on which the telemetry module 44 is mounted. The housing 50 extends axially between the first axial end 58 and the second axial end 60. The transmitter channel 54 is open to the first axial end 58 and is configured to receive a plurality of transmitters 64. The board channel 56 is open to the second axial end 60 and is configured to receive a first connectivity board 66 as will be detailed herein. In some embodiments, the housing 50 may include a wire passage 68 configured to allow the passage of wires from the board channel 56 to the transmitter channel 54. In the embodiment shown in FIGS. 2-5, the telemetry module 44 includes a plurality of alignment pins 70 that extend outwardly from the second axial end 60 for engagement with the connector ring 46 when the telemetry module 44 and the connector ring 46 are coupled to one another. In some embodiments, the telemetry module 44 is a unitary structure. In alternative embodiments, the telemetry module 44 may include two or more circumferential segments that combine to form the annular structure.

Figure 4:
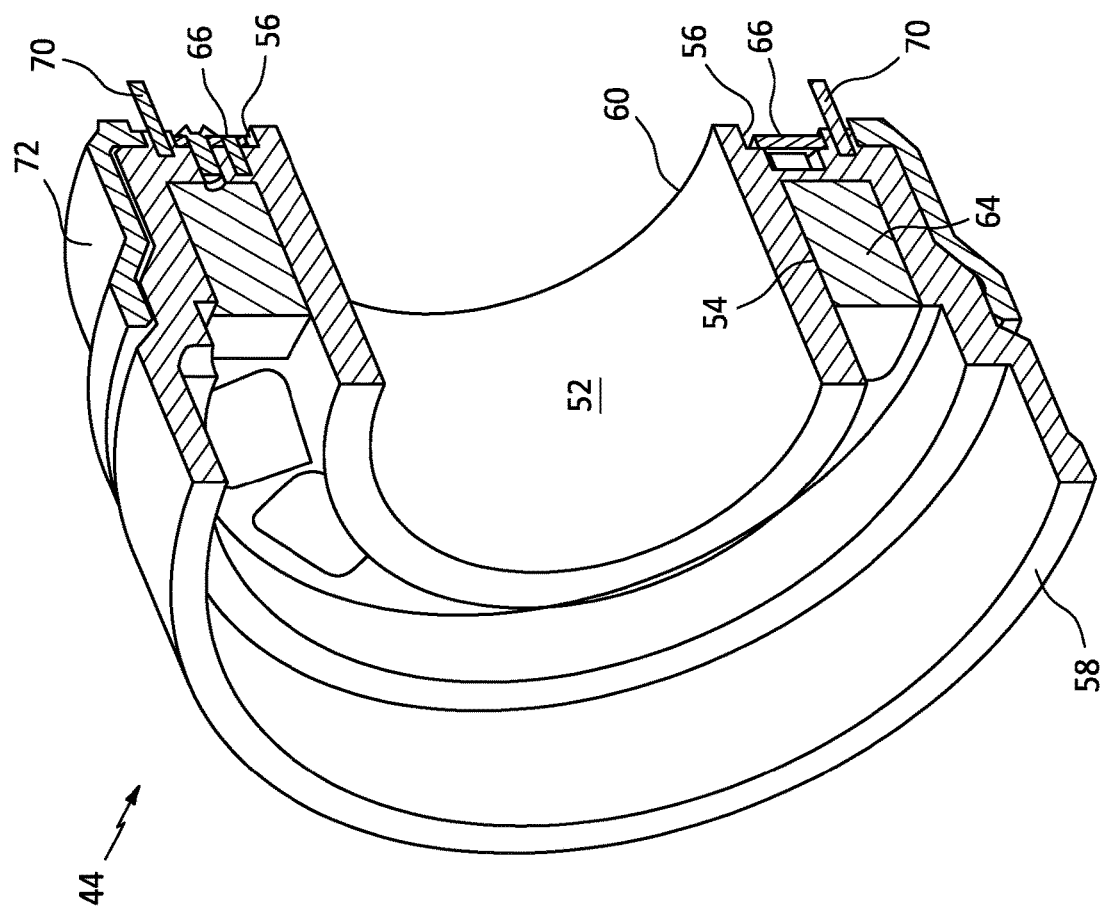
FIG. 4 is a diagrammatic sectional perspective view of a telemetry module embodiment.

In the embodiment shown in FIGS. 3 and 4, the telemetry module 44 may include a thermally insulating sleeve 72 attached to a portion of an outer radial surface of the housing 50. The thermally insulating sleeve 72 is configured as a thermal barrier to protect the electrical components disposed within the telemetry module 44 (e.g., the transmitters 64, the first connectivity board 66, electrical connectors, and the like) from excessive heat.

A plurality of transmitters 64 are disposed within the transmitter channel 54. The transmitters 64 may be discrete components that are circumferentially distributed and spaced apart (e.g., equally spaced apart) from one another within the transmitter channel 54. Additional details regarding the functioning of the transmitters 64 are provided herein.

Figure 5:
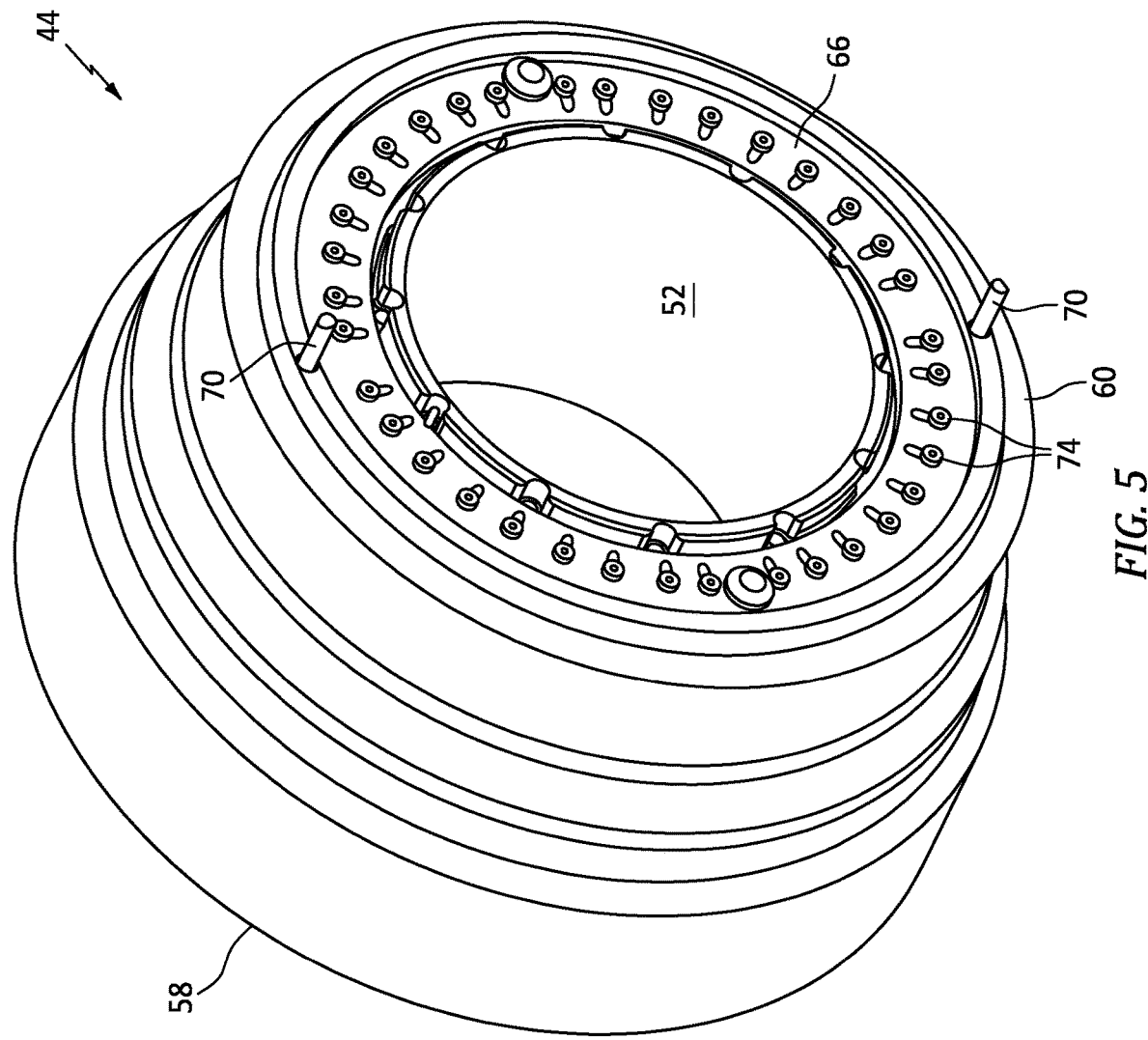
FIG. 5 is a diagrammatic perspective view of a telemetry module embodiment.

The first connectivity board 66 has a ring configuration and is disposed in the board channel 56 at the second axial end 60 of the telemetry module housing 50. FIG. 5 shows a first connectivity board 66 example that is a unitary body. In other embodiments, the first connectivity board 66 may include a plurality of segments that collectively form the ring configuration. In some embodiments, the first connectivity board 66 may include a plurality of first pin receivers 74 distributed around the circumference of the first connectivity board 66. The first connectivity board 66 is configured so that the first pin receivers 74 are in signal communication with structure (e.g., wires or other conductive elements) that is in signal communication with the transmitters 64. For example, the first connectivity board 66 may be configured so that one or more first pin receivers 74 are in signal communication with a respective transmitter 64. In some embodiments, the first pin receivers 74 may be circumferentially positioned to align with second pin receivers 76 within the second connectivity board 78. As will be detailed herein, the present disclosure system may include connector pins 80 that extend between the first and second connectivity boards 66, 78 (e.g., between opposing first and second pin receivers 74, 76) when the telemetry module 44 and the connector ring 46 are coupled with one another to provide signal communication therebetween. A plurality of fasteners may be used to secure the first connectivity board 66 to the telemetry module 44.

Figure 6:
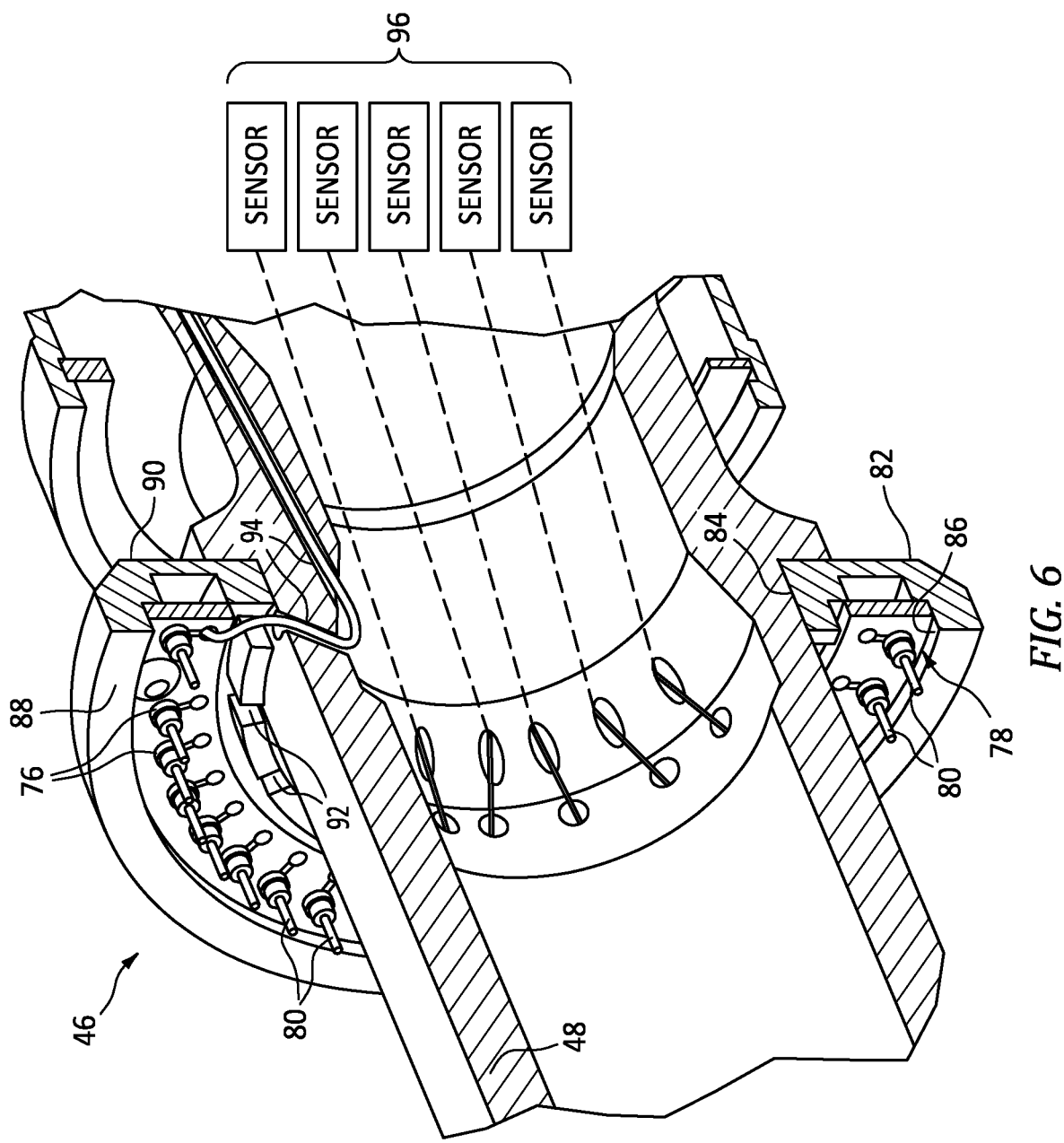
FIG. 6 is a diagrammatic perspective view of a connector ring portion of a telemetry module system embodiment mounted on a shaft.
Figure 7:
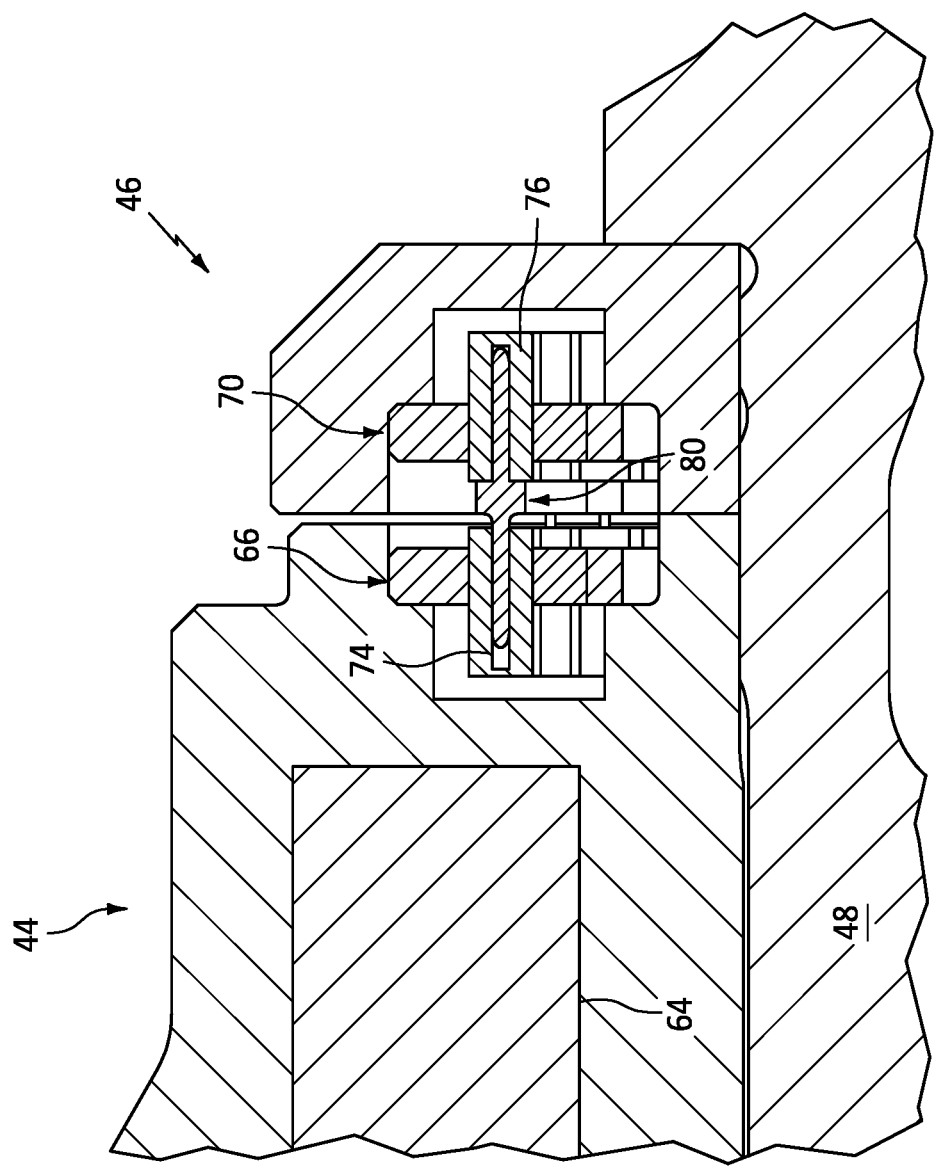
FIG. 7 is a diagrammatic planar partial view of a telemetry module system embodiment.

Referring to FIGS. 2, 6 and 7, the connector ring 46 includes an annular housing 82 and a second connectivity board 78. The annular housing 82 includes a central bore 84, a board channel 86, a first axial end 88, a second axial end 90, and a central axis (e.g., same as central axis 62). The central bore 84 is centered on the central axis 62 and is configured to receive a portion of the shaft 48 on which the connector ring 46 is mounted. The housing 82 extends axially between the first axial end 88 and the second axial end 90. The board channel 86 is open to the first axial end 88 and is configured to receive the second connectivity board 78 as will be detailed herein. In the example diagrammatically shown in FIGS. 2, 6, and 7, the connector ring 46 is a unitary annular structure. In alternative embodiments, the connector ring 46 may include two or more circumferential segments that combine to form the annular structure.

The second connectivity board 78 is a ring-like structure that is disposed in the board channel at the second axial end of the connector ring 46. FIGS. 3 and 6 show a second connectivity board 78 example that is a unitary body. In other embodiments, the second connectivity board 78 may include a plurality of segments that collectively form the ring configuration. In some embodiments, the second connectivity board 78 may include a plurality of second pin receivers 76 distributed around the circumference of the second connectivity board 78. The second connectivity board 78 is configured so that the second pin receivers 76 are in signal communication with structure (e.g., wires or other conductive elements) that is in signal communication with respective sensors (shown diagrammatically) disposed within the engine 20 to measure parameters relating to engine performance, strength and durability of engine parts and modules, and the like. The second pin receivers 76 are circumferentially positioned to align with first pin receivers 74 within the telemetry module 44. As will be detailed herein, in those embodiments that include connector pins 80, the connector pins 80 extend between the first and second connectivity boards 66, 78 (e.g., between opposing first and second pin receivers 74, 76) when the telemetry module 44 and the connector ring 46 are coupled with one another to provide signal communication therebetween. A plurality of fasteners may be used to secure the second connectivity board 78 to the connector ring housing 82.

In some embodiments, the pin connectors 80 may be incorporated into the first pin receivers 74 for engagement with the second pin receivers 76, or conversely the pin connectors 80 may be incorporated into the second pin receivers 76 for engagement with the first pin receivers 74. In these embodiments, independent pin connectors 80 are eliminated and the first and second pin receivers 74, 76 form mating male and female connections.

Referring to the connector ring 46 embodiment shown in FIG. 6, the connector ring 46 may include passages 92 (e.g., slots or the like) that allow wires to pass therethrough for connection to respective second pin receivers 76.

Figure 8:
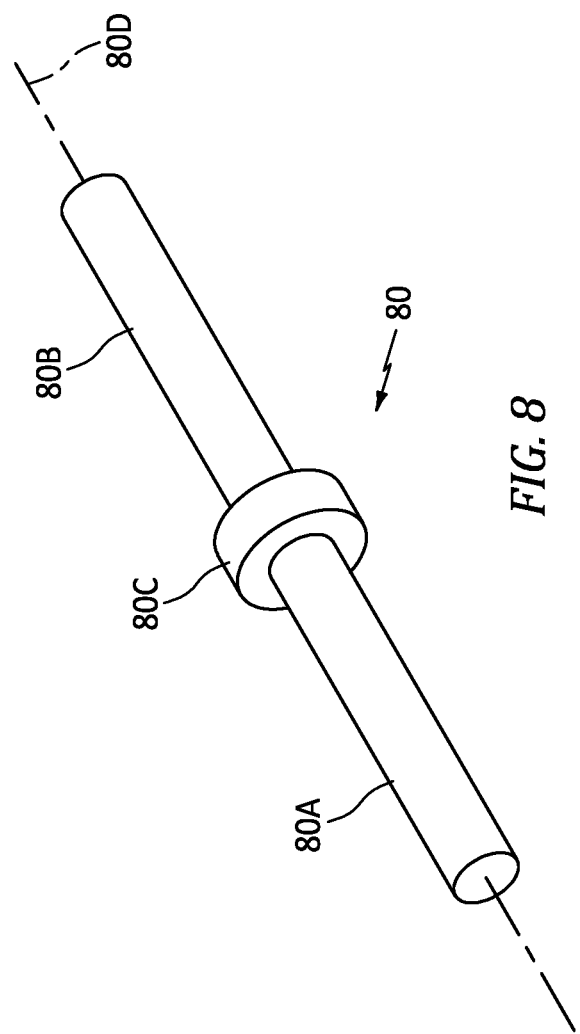
FIG. 8 is a diagrammatic perspective view of a connector pin embodiment.

An example of a connector pin 80 is shown in FIG. 8. The connector pin 80 includes a first pin segment 80A, a second pin segment 80B, and a central collar 80C disposed between the first and second pin segments 80A, 80B. The first and second pin segments 80A, 80B and the central collar 80C are disposed along a central axis 80D. The first pin segment 80A is configured to be engaged with (e.g., received within) a first pin receiver 74 and the second pin segment 80B is configured to be engaged with (e.g., received within) a second pin receiver 76. The central collar 80C extends outwardly from the first and second pin segments 80A, 80B; e.g., perpendicularly from the central axis 80D. In the example shown in FIG. 8, the first and second pin segments 80A, 80B and the central collar 80C are cylindrically configured with the first and second pin segments 80A, 80B having a smaller diameter than the central collar 80C. The present disclosure is not limited to this example of a connector pin 80 configuration. For example, some connector pin 80 embodiments may not include a central collar 80C, and/or the first and second pin segments 80A, 80B may not be cylindrically configured, or the like. Each connector pin 80 is configured to provide an electrical connection between a respective first pin receiver 74 and a respective second pin receiver 76, and therefore an electrical connection between the telemetry module 44 and the connector ring 46. In some embodiments, the first and second pin segments 80A, 80B and the first and second pin receivers 74, 76 may be configured to form a slight press fit therebetween to ensure contact therebetween. The present disclosure is not limited, however, to any type of connection between a pin segment 80A, 80B and a pin receiver 74, 76 other than one that provides an electrical connection.

Referring to FIG. 6, in some embodiments the shaft 48 may include axially extending internal passages 94 disposed within the shaft 48 wall around the circumference of shaft 48 for routing the wires extending between the second connectivity board 78 and the respective sensors 96 disposed within the engine 20. The present disclosure is not limited to any particular shaft 48 configuration including any particular shaft wire passages 94.

In some embodiments, the transmitters 64 may be configured to transmit signals (e.g., radio frequency (RF) signals) representative of sensor input via one or more rotating RF antennas (not shown) disposed with the telemetry module 44. One or more stationary RF antennas (not shown) may be disposed to receive the signals produced by the transmitters and sent via the rotating RF antennas. The power to drive the transmitters 64 may be provided inductively; e.g., using a rotatable inductor coil (not shown) provided with or attached to the telemetry module 44 and a stationary inductor coil (not shown) disposed in proximity to the rotatable inductor coil. Electrical power is provided to the stationary inductor coil from a power source (not shown). The rotatable and stationary inductor coils form a transformer to transmit power across an air gap between the stationary inductor coil and the rotatable inductor coil. This structure for transmitting signals and for providing power to the telemetry module 44 is provided as an example and the present disclosure is not limited to this example structure.

The present disclosure present disclosure telemetry module system 42 having a telemetry module 44 and a connector ring 46 that couple to form electrical and physical connections therebetween provides numerous advantages. For example, as indicated herein the telemetry module 44 may be deployed in a space limited region within an engine 20. The configuration of the present disclosure telemetry module system 42 having a telemetry module 44 and a connector ring 46 facilitates the installation of the telemetry module 44 in tight spaces. The present disclosure telemetry module system 42 allows the second connectivity board 78 to be connected to the wires (or other conductive elements-generically referred to as the "sensor wires") from the sensors 96 and the connector ring housing 82 and the second connectivity board 78 may then be mounted on the shaft 48. Alternatively, the connector ring 46 and second connectivity board 78 may be mounted on the shaft 48 initially, and the sensor wires connected to the second connectivity board 78 subsequently. Regardless of the order of assembly, the connector ring 46 and second connectivity board 78 may be tested to verify signal communication acceptability between the second connectivity board 78 and the sensors. In a similar manner, the telemetry module 44 may be assembled prior to being mounted on the shaft 48; e.g., the first connectivity board 66 and the transmitters 64 may be mounted within the telemetry module housing 50 and conductive elements (e.g., wires) may be installed between the transmitters 64 and the first connectivity board 66. The assembled telemetry module 44 may then be tested to verify acceptable connectivity between the transmitters 64 and the first connectivity board 66. The ability to test and verify signal connectivity within the telemetry module 44 and the connector ring 46 independently facilitates both the installation and the testing process.

More significantly, some embodiments of the present disclosure telemetry module system 42 having a telemetry module 44 and a connector ring 46 permit assembly and testing in a clean room environment that obviates the limited space issues, and facilitates both assembly and testing. In some applications, the telemetry module 44 and connector ring 46 may be assembled, tested, and mounted on a shaft 48 in an clean room environment, and the assembly subsequently installed in a gas turbine engine 20. In these instances, the potential for an issue arising during assembly, mounting, and testing is greatly diminished.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A telemetry module system for mounting on a rotatable shaft having a central axis, the system comprising:
   a telemetry module (TM) having an annular TM housing, a plurality of transmitters, and a first connectivity board, wherein the TM housing extends axially between a TM first axial end and a TM second axial end and includes a TM central bore configured to receive the shaft for mounting of the telemetry module on the shaft;
   wherein each transmitter of the plurality of transmitters is configured to produce radio-frequency signals based on a sensor input signal; and
   wherein the first connectivity board has a ring configuration and is attached to the TM housing at the TM second axial end, and the first connectivity board is in signal communication with the plurality of transmitters;
   a connector ring (CR) having an annular CR housing and a second connectivity board, wherein the CR housing extends axially between a CR first axial end and a CR second axial end and includes a CR central bore configured to receive the shaft for mounting of the connector ring on the shaft;
   wherein the second connectivity board has a ring configuration and is attached to the CR housing at the CR first axial end, and the second connectivity board is configured to receive sensor input signals; and wherein the telemetry module and the connector ring are configured to be disposed in a coupled configuration and in the coupled configuration the first connectivity board is in signal communication with the second connectivity board.

2. The telemetry module system of claim 1, wherein the first connectivity board includes a plurality of first pin receivers distributed around a circumference of the first connectivity board, and the plurality of first pin receivers are in signal communication with the plurality of transmitters; and wherein the second connectivity board includes a plurality of second pin receivers distributed around a circumference of the second connectivity board, and the plurality of second pin receivers are configured to receive the sensor input signals.

3. The telemetry module system of claim 2, wherein the plurality of first pin receivers are aligned with the plurality of second pin receivers in the coupled configuration.

4. The telemetry module system of claim 3, further comprising a plurality of connector pins, wherein each said connector pin of the plurality of connector pins is configured for engagement with a respective first pin receiver and a respective second pin receiver, and each said connector pin is configured to provide signal communication between the respective first pin receiver and the respective second pin receiver.

5. The telemetry module system of claim 4, wherein each connector pin includes a first pin segment and a second pin segment, and the first pin segment is configured to be received within the respective first pin receiver, and the second pin segment is configured to be received within the respective second pin receiver.

6. The telemetry module system of claim 5, wherein each said connector pin includes a central collar disposed between the first and second pin segments.

7. The telemetry module system of claim 1, wherein the TM housing includes a board channel that is open to the TM second axial end and the first connectivity board is disposed within the board channel.

8. The telemetry module system of claim 1, wherein the TM housing includes a transmitter channel that is open to the TM first axial end and the plurality of transmitters are disposed within the transmitter channel.

9. The telemetry module system of claim 1, wherein the TM housing is a unitary structure.

10. The telemetry module system of claim 1, wherein the connector ring is a unitary structure.

11. A gas turbine engine, comprising:
a compressor section;
a combustor section;
a turbine section;
a rotatable engine shaft having a central axis;
a plurality of sensors configured to produce sensor signals; and
a telemetry module system for mounting on the rotatable shaft having a central axis, wherein the telemetry module system includes:
a telemetry module (TM) having an annular TM housing, a plurality of transmitters, and a first connectivity board, wherein the TM housing extends axially between a TM first axial end and a TM second axial end and includes a TM central bore, and wherein the shaft is received within the TM central bore, and wherein each transmitter of the plurality of transmitters is configured to produce radio-frequency signals based on a sensor input signal, and wherein the first connectivity board has a ring configuration and is attached to the TM housing at the TM second axial end, and the first connectivity board is in signal communication with the plurality of transmitters;

and a connector ring (CR) having an annular CR housing and a second connectivity board, wherein the CR housing extends axially between a CR first axial end and a CR second axial end and includes a CR central bore, wherein the shaft is received within the CR central bore, wherein the second connectivity board has a ring configuration and is attached to the CR housing at the CR first axial end, and the second connectivity board is configured to receive the sensor signals; and wherein the telemetry module and the connector ring are configured to be disposed in a coupled configuration and in the coupled configuration the first connectivity board is in signal communication with the second connectivity board.

12. The gas turbine engine of claim 11, wherein the first connectivity board includes a plurality of first pin receivers distributed around a circumference of the first connectivity board, and the plurality of first pin receivers are in signal communication with the plurality of transmitters; and wherein the second connectivity board includes a plurality of second pin receivers distributed around a circumference of the second connectivity board, and the plurality of second pin receivers are configured to receive the sensor input signals.

13. The gas turbine engine of claim 12, wherein the plurality of first pin receivers are aligned with the plurality of second pin receivers in the coupled configuration.

14. The gas turbine engine of claim 13, wherein the telemetry module system includes a plurality of connector pins, wherein each said connector pin of the plurality of connector pins is configured for engagement with a respective first pin receiver and a respective second pin receiver, and each said connector pin is configured to provide signal communication between the respective first pin receiver and the respective second pin receiver.

15. The gas turbine engine of claim 14, wherein each connector pin includes a first pin segment and a second pin segment, and the first pin segment is configured to be received within the respective first pin receiver, and the second pin segment is configured to be received within the respective second pin receiver.

16. The gas turbine engine of claim 15, wherein each said connector pin includes a central collar disposed between the first and second pin segments.

17. The gas turbine engine of claim 11, wherein the TM housing includes a board channel that is open to the TM second axial end and the first connectivity board is disposed within the board channel.

18. The gas turbine engine of claim 11, wherein the TM housing includes a transmitter channel that is open to the TM first axial end and the plurality of transmitters are disposed within the transmitter channel.

19. The gas turbine engine of claim 11, wherein the TM housing is a unitary structure.

20. The gas turbine engine of claim 11, wherein the connector ring is a unitary structure.

* * * * *